United States Patent Office 3,803,111
Patented Apr. 9, 1974

3,803,111
PROCESS FOR SPRAY-DRYING ACRYLIC
POLYMER SOLUTIONS
John Galvin Munro and Walter Sadowski, Louisville,
Ky., assignors to Celanese Coatings Company, New
York, N.Y.
No Drawing. Filed May 15, 1972, Ser. No. 253,213
Int. Cl. C08f 3/64, 3/66, 15/18
U.S. Cl. 260—89.5 S                              7 Claims

ABSTRACT OF THE DISCLOSURE

Dry, free-flowing powders having little or no electrostatic charge retention and substantially free from webbing are obtained by a process which comprises the steps of: (1) preparing an acetone solution of an acrylic polymer, which solution has a viscosity of less than about 13 seconds (#4 Ford cup) and the ratio of acetone to other organic solvents is at least 3; (2) adding to the product of step (1) from 3 to about 10 percent water, based on the volume of acetone employed; and (3) spray-drying the product of step (2). The powders thus obtained are useful as coating powder compositions which can be applied by either electrostatic spraying or fluidized beds, with excellent results.

BACKGROUND OF THE INVENTION

This invention relates to spray-drying. More particularly, this invention relates to a process for spray-drying acrylic polymer solutions which yields dry, free-flowing powders having little or no electrostatic charge retention.

Coating powders are a fairly recent innovation in the art, having as advantages the absence of polluting solvents or liquids, reduced waste of coating material, no need for the recovery of volatiles, and the ability to apply thick films in a single application. Such powders have been prepared by mixing together powdered resin, a liquid plasticizer, and a liquid stabilizer, as disclosed in U.S. Pat. 3,136,651; the resultant solid is ground to give a coating powder composition. However, such a process is not entirely satisfactory, since complete mixing is not obtained and the process requires several steps which involve material losses.

In addition to such processing difficulties, melt blending or extrusion processes involve several other problems which are directly related to the use of the products of such processes as coating powders. First, the required grinding step yields a product having a relatively wide range of particle sizes. Consequently, the larger particles which are unsuitable for application as coating powders must be reprocessed or re-ground in order to reduce the average particle size. Alternatively, the grinding process must be extended in order to reduce or eliminate such unusable material. Second, when melt blending thermosetting materials, there is the added danger that the process itself will cause partial (or even complete) curing of the material being processed. This danger, while not imminent, does add to processing costs. Third, the grinding step results in powders having unsymmetrical and irregular geometries. Since coating powders often are applied by electrostatic means, the particles constituting a coating powder must be able to accept an electrostatic charge. When the particles have irregular geometries, the transfer of the electrostatic charge becomes more difficult. Finally, the grinding of a coating composition containing metallic pigments destroys the esthetic effect for which metallic pigments are added; the grinding process in effect mutilates thte metallic pigment particles. Consequently, satisfactory metallic coating powders have not heretofore been prepared by a melt blending or extrusion process since a grinding step is required.

All of the foregoing problems and difficulties can be avoided by employing an alternate process to prepare the coating powders; i.e., spray-drying. Of course, spray drying per se is old in the art; the process of spray-drying fluid substances dates back to 1872. Nevertheless, the successful spray-drying of acrylic polymer solutions has not heretofore been known. This is not to say that powders comprising acrylic polymers have not previously been obtained by means of a spray-drying process. For example, U.S. Pat. 3,325,425 relates to the spray-drying of aqueous acrylic polymer dispersion paints. Although the dry, powdered compositions thus obtained are readily redispersible in water, such powdered compositions have not been employed as coating powders per se. In fact, such powdered compositions simply are unsuitable for use as coating powders since the properties of cured or baked films obtained therefrom are insufficient in those areas utilizing coating powder technology; i.e., automotive and appliance finishes. Yet these same areas employ solution acrylic polymer coating compositions with eminently satisfactory results.

On the other hand, solutions of polymers other than acrylics have been spray-dried successfully, as evidenced by U.S. 3,561,003, which teaches a process for spray-drying solutions of polymeric fatty acid amides, epoxy resins, or polystyrene to give polymer particles having a particle size of not more than 30 microns. The disclosed process comprises the steps of (1) dissolving the polymer in a suitable solvent, such as chloroform or toluene/isopropanol, (2) adding to the solution thus obtained, in such a manner as to form a uniform mixture, a diluent which is a non-solvent for the polymer in an amount from 50 percent to 100 percent of that required to cause incipient precipitation (first signs of cloudiness), examples of such diluents being methanol, acetone, and acetone/water, and (3) spray-drying the product of step (2).

Attempts to apply the teachings of U.S. 3,561,003 to the spray-drying of acrylic polymer solutions were dramatically unsuccessful. Two major problems existed: (1) webbing and (2) electrostatic charge retention. By webbing is meant the formation, upon spray-drying, of long, stringly masses of ploymer; that is, the spray-dried polymer was fibrous in nature, rather than a free-flowing powder. The phenomenon of webbing appears to be unrelated to the second major problem, electrostatic charge retention. During the spray-drying process, the polymer particles thus obtained were charged; as a result, particles both attracted and repelled each other. Consequently, the particles would adhere tightly to the walls of the equipment and agglomerate into lumps or masses of polymer. Other particles would literally fly out of the apparatus if the latter were opened. Attempts to remove electrostatic charge by means of a nuclear electrostatic eliminator failed; the particles coated the electrostatic eliminator and rendered it ineffective.

SUMMARY OF THE INVENTION

It therefore is an object of the present invention to provide a process for spray-dryding acrylic polymer solutions.

It also is an object of the present invention to provide a process for spray-drying acrylic polymer solutions which yields dry, free-flowing powders having little or no electrostatic charge retention.

Yet another object is to provide a process for spray-drying acrylic polymer solutions which yields dry, free-flowing powders substantially free from webbing.

These and other objects will be apparent to those skilled in the art from a consideration of the specification and claims which follow.

According to the present invention, dry, free-flowing powders substantially free from webbing and having little or no electrostatic charge retention are obtained by the process which comprises the steps of: (1) preparing an acetone solution of an acrylic polymer, which solution has a viscosity of less than about 13 seconds (#4 Ford cup) and the ratio of acetone to other organic solvents is at least 3; (2) adding to the product of step (1) from 3 to about 10 percent water, based on the volume of acetone employed; and (3) spray-drying the product of step (2).

The powders thus obtained are useful as coating powder compositions which can be applied by either electrostatic spraying or fluidized beds, with excellent results.

DETAILED DESCRIPTION OF THE INVENTION

The term "acrylic polymer" as used herein includes any polymer prepared by the free-radical addition polymerization of one or more ethylenically-unsaturated monomers, at least 50 weight percent of which is selected from the group consisting of acrylic and methacrylic acid, alkyl, cycloalkyl, and aralkyl esters of acrylic and methacrylic acids, wherein the ester moiety contains from 1 to about 18 carbon atoms, and the hydroxyalkyl esters of acrylic and methacrylic acids, wherein the hydroxyalkyl moiety contains from 2 to about 10 carbon atoms.

Examples of suitable alkyl, cycloalkyl, aralkyl, and hydroxyalkyl esters of acrylic and methacrylic acids include, among others, methy acrylate, ethyl acrylate, isopropyl acrylate, n-butyl acrylate, t-butyl acrylate, 2-ethylhexyl acrylate, dodecyl acrylate, octadecyl acrylate, methyl methacrylate, n-butyl methacrylate, 2-ethylhexyl methacrylate, octyl methacrylate, tridecyl methacrylate, hexadecyl methacrylate, cyclohexyl acrylate, cyclohexyl methacrylate, benzyl acrylate, benzyl methacrylate, isobornyl acrylate, isobornyl methacrylate, beta-hydroxyethyl acrylate, beta-hydroxyethyl methacrylate, beta-hydroxypropyl acrylate, beta-hydroxypropyl methacrylate, gamma-hydroxypropyl methacrylate, beta-hydroxybutyl acrylate, gamma-hydroxybutyl methacrylate, delta-hydroxybutyl acrylate, beta-hydroxyoctyl acrylate, and beta-hydroxy decyl methacrylate.

The remaining 50 weight percent or less of said ethylenically-unsaturated monomers consists of at least one monomer selected from the group consisting of:

(1) acrylic monomers other than those cited hereinabove, which monomers generally encompass aryl and reactive esters of acrylic and methacrylic acids, such as phenyl acrylate, phenyl methacrylate, aziridinyl acrylate, glycidyl methacrylate, 2-aminoethyl acrylate, 2-aminopropyl methacrylate, 3-aminopropyl methacrylate, and the like;

(2) ethacrylic and crotonic acids and esters thereof, such as ethyl ethacrylate, methyl crotonate, octyl ethacrylate, heptyl crotonate, octadecyl ethacrylate, cyclohexyl ethacrylate, benzyl crotonate, phenyl ethacrylate, and the like;

(3) amides, alkylol amides, and alkoxyalkyl amides of acrylic, methacrylic, and crotonic acids, wherein the alkyl moneties contain from 1 to about 4 carbon atoms and the alkoxy moiety contains from 1 to about 8 carbon atoms, specific examples being acrylamide, methacrylamide, crotonamide, methylol acrylamide, methoxymethyl methacrylamide, butoxymethyl acrylamide, 2-ethylhexoxymethyl methacrylamide, diacetone acrylamide, and the like;

(4) alpha, beta-ethylenically-unsaturated dicarboxylic acids and anhydrides, such as maleic acid, maleic anhydride, fumaric acid, itaconic acid, mesaconic acid, and the like;

(5) mono- and diesters of alpha, beta-ethylenically-unsaturated dicarboxylic acids, examples of which esters are fumaric acid monoethyl ester, dimethyl itaconate, dipropyl mesaconate, diisopropyl maleate, dicyclohexyl maleate, maleic acid mono (beta-hydroxyethyl) ester, and the like;

(6) alpha,beta-ethylenically-unsaturated nitriles, such as acrylonitrile, methacrylonitrile, ethacrylonitrile, crotonic nitrile, and the like;

(7) vinyl aromatic compounds, such as styrene, vinyltoluene, vinylnaphthalene, chlorostyrene, bromostyrene, and the like.

(8) monounsaturated hydrocarbons, such as ethylene, propylene, and the like;

(9) no more than about 10 weight percent of vinyl esters of aliphatic monocarboxylic acids having from 1 to about 18 carbon atoms, such as vinyl acetate, vinyl propionate, vinyl octanoate, vinyl stearate, and the like; and

(10) no more than about 10 weight percent of halogen-containing unsaturated hydrocarbons, such as vinyl chloride, vinyl fluoride, vinylidene chloride, vinylidene fluoride, and the like.

It should be readily apparent to those skilled in the art that the acrylic polymers suitable for use in the present invention include both thermoplastic and thermosetting polymers. Since the methods of preparing such polymers are so well known in the art, no discussion of such methods need be presented herein. Furthermore, as is well known in the art, the thermosetting acrylic polymers can be employed with any of the known curing agents, such as epoxy resins, aminoplast resins, polyisocyanates, and the like.

In general, the suitable acrylic polymers are solids at ambient temperature. Stated differently, the suitable acrylic polymers have glass transition temperatures above about 25° C. As a practical matter, however, the coating powder compositions obtained by means of the process disclosed herein should be capable of storage at temperatures greater than ambient temperature. That is, the coating powder compositions preferably will remain free-flowing, i.e., non-scintering, at temperatures above about 35° C. Consequently, it is preferred that the acrylic polymers have glass transition temperatures above about 35° C.; most preferably, the glass transition temperatures will be above about 45° C.

As stated hereinbefore, the first step of the disclosed process consists of dissolving an acrylic polymers in an amount of acetone sufficient to give a solution having a viscosity less than about 13 seconds (#4 Ford cup). In the second step, from about 3 to about 10 percent water, based on solution volume, is added to the acetone solution of the acrylic polymer. While the water and acetone are miscible in all proportions, the addition of water in the second step always results in the separation of some acrylic polymer from solution, as evidenced by the turbidity of the resulting product. However, the product obtained from the second step is sufficiently stable that continuous agitation is not required. Finally, the product obtained from the second step is spray-dried in conventional equipment.

If desired, pigments, fillers, plasticizers, curing agents, flow-control agents, and other additives and modifiers can be employed. The use of such materials is preferred since the powders obtained from the process of the present invention are to be employed as coating powder compositions. When such materials are used, they will be added as a part of the first step. Because acetone generally is a poor wetting agent for pigments, fillers, and similar materials, an alternate procedure is preferred.

Coating compositions based on acrylic polymer solutions are both well known and widely used in the art. Such compositions generally can be grouped into two classes: (1) acrylic lacquers and (2) acrylic enamels. As used herein, an acrylic lacquer is a paint based on the organic solvent solution of an acrylic polymer with additives and modifiers dispersed or dissolved therein, which paint forms a film by evaporation of solvent at elevated temperatures. An acrylic enamel is similar to an acrylic lacquer, except that film formation occurs both by solvent evaporation and cross-linking of the acrylic polymer, usually with a curing agent added as a part of the additives and modifiers, both processes occurring at elevated temperatures.

It therefore is preferred to employ in the first step of the process of the present invention an acrylic lacquer or an acrylic enamel, in which case acetone is added to the acrylic lacquer or acrylic enamel until two criteria are met: (1) the viscosity of the resulting diluted product must be less than about 13 seconds (#4 Ford cup), and (2) the ratio of acetone to organic solvent originally present in said acrylic enamel is greater than about 3 and preferably greater than about 4. The second step, which consists of the addition of water to the product obtained in the first step, then is carried out as described hereinabove, except that the amount of water is based on the volume of acetone added in the first step, rather than on total solution volume. The third step, spray-drying, then is carried out.

Carrying out the process of the persent invention with an acrylic lacquer or an acrylic enamel as the starting material results in powders having little electrostatic charge retention and little webbing, as a general rule. If electrostatic charge retention and/or webbing are deemed excessive, the process can be repeated by using the powder thus obtained as the starting material. By reprocessing in this manner, electrostatic charge retention and webbing can be eliminated.

Without intending to limit it in any manner, the present invention will be more fully described by the following examples which illustrate certain preferred embodiments of the invention. Unless otherwise indicated, all percentages and parts are by weight. The materials employed in the examples are identified as follows:

ACRYLIC RESIN A

| Composition: | Percent |
|---|---|
| Methacrylic acid | 0.83 |
| Hydroxypropyl methacrylate | 15.17 |
| Methyl methacrylate | 37 |
| n-Butyl methacrylate | 47 |

Solids: 98.5% (Resin originally prepared in xylol and kettle-stripped)

ACRYLIC RESIN B

| Composition: | Percent |
|---|---|
| Methacrylic aicd | 1.32 |
| Hydroxypropyl methacrylate | 14.68 |
| Methyl methacrylate | 37.00 |
| n-Butyl methacrylate | 47.00 |

Preparation: Prepared in xylol in the presence of 10 weight percent, based on monomers, of cumene hydroperoxide
Constants:
  48.4 non-volatiles
  Gardner-Holdt viscosity of K-L
  Reduced viscosity (40% solids in xylol) of A-B

ACRYLIC RESIN C

Acryloid A–21LV, a lower molecular weight thermoplastic acrylic ester resin, from Rohm and Haas Company, Philadelphia, Pa., and supplied as a 30% solids solution in toluol/methyl ethyl ketone/butanol (50/40/10).

ACRYLIC RESIN D

| Composition: | Percent |
|---|---|
| Methacrylic acid | 0.83 |
| Hydroxypropyl methacrylates | 15.17 |
| n-Butyl acrylate | 15 |
| n-Butyl methacrylate | 39 |
| Styrene | 30 |

Solids: 99% (Resin originally prepared in xylol and kettle-stripped).

ACRYLIC RESIN E

| Composition: | Percent |
|---|---|
| Methyl acrylate | 3.00 |
| Methyl methacrylate | 72.75 |
| n-Butyl methacrylate | 24.25 |

Preparation: Prepared in toluene-acetone (91.9/8) in the presence of t-butyl peroxide
Constants:
  40.3% non-volatiles
  Gardner-Holdt viscosity of $Z_3$
  Reduced viscosity (30 solids in toluene) of Q

CURING AGENT A

Composition: A blocked triisocyanate, prepared by reacting 3 moles of 1-isocyanato-3-isocyanatomethyl-3,5,5-trimethylcyclohexane with 1 mole of 1,1,1-tris-(hydroxymethyl)propane in methyl isobutyl ketone, followed by blocking with methyl ethyl ketoxime
Solids: 98% (spray-dried)

Flow Control Agent A.—Modaflow (Monsanto Company, Inc., St. Louis, Mo.).

Plasticizer A.—Santicizer S–429, a polymeric plasticizer supplied by Monsanto Company, St. Louis, Mo.

In each example, spray-drying was accomplished in a commercial laboratory spray drier manufactured by Anhydro A/S, Copenhagen, Denmark, and distributed by Tower Iron Works, Spray Drier Division, Seekonk, Mass.

EXAMPLE 1

An acetone solution of Acrylic Resin A was prepared by dissolving the resin in an amount of acetone sufficient to give a solution having a viscosity of 15.5 seconds (#4 Ford cup). To the resulting solution was added an amount of water equivalent to 7 volume percent, based on solution volume, which caused the original solution to become turbid. The final mixture then was spray-dried conventionally under the following conditions:

| | |
|---|---|
| Spray mode | Internal. |
| Inlet air temperature | 65° C. |
| Outlet air temperature | 41° C. |
| Atomizer air pressure | 1.5 kg./cm.$^2$. |
| Feed rate | 40 ml./min. |

Although there was good carry-over to the cyclone, the resulting powder exhibited high electrostatic charge and agglomerated severely. The powder was 97.7% non-volatiles.

EXAMPLE 2

The procedure of Example 1 was repeated, except that the amount of acetone employed was increased in order to provide a solution having a viscosity of 10.5 seconds (#4 Ford cup). The resulting powder was 98% non-volatiles and was free of both electrostatic charge and webbing. The powder was very fluid and free from agglomeration.

The powders from Examples 1 and 2 separately were applied to Bonderite 1000 panels by means of electrostatic spraying. The panels then were baked at 400° F. for 20 minutes; in each case film thickness was about 2 mils. The film obtained from the powder from Example 1 showed some orange peel, whereas the film from the powder from Example 2 showed only a little orange peel.

EXAMPLE 3

Acrylic Resin A, 70 parts, was dry-blended with 30 parts of Curing Agent A. The mixture was dissolved in an amount of acetone sufficient to give a solution having a viscosity of 11.8 seconds (#4 Ford cup). To this solution was added 7 volume percent of water, based on solution volume, which caused the original solution to become turbid. The final mixture was spray-dried under the following conditions:

| | |
|---|---|
| Spray mode | Internal. |
| Inlet air temperature | 62° C. |
| Outlet air temperature | 40° C. |
| Atomizer air pressure | 1.5 kg./cm.$^2$. |
| Feed rate | 45 ml./min. |

There was good carry-over to the cyclone and the powder produced was substantially free of electrostatic charge and webbing. Further, the powder, which was 98% non-volatiles, did not scinter upon standing.

The powder from Example 3 was readily applied to Bonderite 1000 panels by electrostatic spraying. The coated panels were cured at 325° F. for 30 minutes to give completely cured and coalesced films. Film thickness was about 2 mils.

EXAMPLE 4

Acrylic Resin A, 51.7 parts, was dry-blended with 22.2 parts of Curing Agent A. To this mixture was added sufficient acetone to form a solution, 25.5 parts of titanium dioxide pigment, and 0.06 parts of Flow Control Agent A (0.6 weight percent, based on total solids). The mixture was pebble milled for 18 hours. The resulting slurry was diluted with additional acetone, giving a mixture having a viscosity of 11.4 seconds (#4 Ford cup). Water equivalent to 7 volume percent was added and the final mixture was spray-dried under the following conditions:

| | |
|---|---|
| Spray mode | Internal. |
| Inlet air temperature | 67° C. |
| Outlet air temperature | 40° C. |
| Atomizer air pressure | 1–5 kg./cm.$^2$. |
| Feed rate | 40 ml./min. |

The resulting extremely fine powder was 97.1% non-volatiles and possessed very little electrostatic charge. The powder was fluid and did not scinter.

Following the procedure of Example 3, panels were coated and cured, using the powder from Example 4. The films showed good gloss with slight cratering. The craters were eliminated by sieving the powder, applying the course portion first, followed by applying the fine portion, then curing.

EXAMPLE 5

A mixture of 16.7 parts of titanium dioxide pigment, 5.4 parts of Acrylic Resin B, and sufficient acetone to give a mixture having a resin solids content of 20% was pebble milled for 18 hours. An additional 42.7 parts of Acrylic Resin B and additional acetone were added, and the resulting mixture was poured into teflon-coated trays to a depth of 0.25 inch or less. The trays were placed in an oven at 300° F. and the mixture force-dried until solids content was greater than 99.5%. The dried material was taken up in acetone and 0.2 part of Flow Control Agent A, based on total solids, and 10 parts of Curing Agent A added, followed by additional acetone, to give a mixture having a viscosity of 11.5 seconds (#4 Ford cup). To this mixture was added 7 volume percent of water, based on mixture volume. The resulting mixture was spray-dried under the following conditions:

| | |
|---|---|
| Spray solids | 33%. |
| Spray mode | Internal. |
| Inlet air temperature | 82° C. |
| Outlet air temperature | 50° C. |
| Atomizer air pressure | 1.5 kg./cm.$^2$. |
| Feed rate | 35 ml./min. |

The resulting powder, at 97.3% non-volatiles, was substantially free from electrostatic charge and exhibited no webbing or agglomeration.

Following the procedure of Example 3, the powder sprayed well electrostatically onto Bonderite 1000 panels and, upon curing, produced films which were smooth with good gloss. The cured films initially were tacky, but the tackiness could be removed with mineral spirits, indicating exuded flow control agent.

EXAMPLE 6

A mixture of 271 parts of Acrylic Resin C, 30 parts of Plasticizer A, and 5 parts of cellulose acetate butyrate (EAB 531–1 from Eastman Kodak Company, Rochester, N.Y.) was force-dried as described in Example 5. The resulting material was dissolved in an amount of acetone sufficient to give a solution having a viscosity of 10.8 seconds (#4 Ford cup). To the solution was added 7 volume percent of water, based on solution volume. The resulting turbid mixture was spray-dried under the following conditions:

| | |
|---|---|
| Spray solids | 10%. |
| Spray mode | External. |
| Inlet air temperature | 80° C. |
| Outlet air temperature | 40° C. |
| Atomizer air pressure | 2.0 kg./cm.$^2$. |
| Feed rate | 40 ml./min. |

There was excellent carry-over to the cyclone and the powder produced had low electrostatic charge and was free from webbing and agglomeration. The solids content of the powder was greater than 99%.

EXAMPLE 7

The procedure of Example 4 was repeated, except that Acrylic Resin A was replaced with 51.8 parts of Acrylic Resin D, and the acetone mixture had a viscosity of 11.2 seconds (#4 Ford cup), and Flow Control Agent was omitted. The final mixture was spray-dried under the following conditions:

| | |
|---|---|
| Spray solids | 30%. |
| Spray mode | Internal. |
| Inlet air temperature | 75° C. |
| Outlet air temperature | 48° C. |
| Atomizer air pressure | 1.5 kg./cm.$^2$. |
| Feed rate | 35 ml./min. |

There was excellent carry-over to the cyclone and the 97.5% non-volatiles powder was free of electrostatic charge, webbing, and agglomeration.

EXAMPLE 8

A light blue metallic solution lacquer was prepared, with the following composition:

| Component: | Parts |
|---|---|
| Acrylic Resin E | [1] 807.6 |
| Plasticizer A | 285.0 |
| Cellulose acetate butyrate | 193.2 |
| Phthalocyaine blue | 1.6 |
| Aluminum flake | 11.0 |
| Toluene | 1437.4 |
| Acetone | 387.1 |
| Cellosolve acetate | 145.1 |
| Isobutyl isobutyrate | 10.4 |

[1] Solids basis.

The lacquer was force-dried as described in Example 5. To 262 parts of the dried material was added 2400 parts of acetone, giving a mixture which was about 10% non-volatiles and had a viscosity of 11.7 seconds (#4 Ford cup). To this mixture was added 224 parts of water (7 volume percent, based on solution volume). The resulting mixture was spray-dried under the following conditions:

| | |
|---|---|
| Spray mode | External. |
| Inlet air temperature | 70° C. |
| Outlet air temperature | 45° C. |
| Atomizer air pressure | 1.50 kg./cm.$^2$. |
| Feed rate | 45 ml./min. |

The mixture sprayed well, giving a powder at 98.6% non-volatiles. The powder exhibited only slight webbing and electrostatic charge. Panels were prepared as described in Example 1. The powder flowed well.

It is to be understood that the foregoing detailed description is given merely by way of illustration and that many variations may be made therein without departing from the spirit of the invention.

What is claimed is:

1. A process for spray-drying acrylic lacquers and acrylic enamels to give free-flowing powders substantially free from webbing and having little or no static charge retention, which comprises the steps of:
   (1) preparing an acetone solution of an acrylic polymer, wherein said polymer is prepared by the free-radical addition polymerization of one or more ethylenically-unsaturated monomers, at least 50 weight percent of which is selected from the group consisting of acrylic and methacrylic acid, alkyl, cycloalkyl and aralkyl esters of acrylic and methacrylic acids, wherein the ester moiety contains from 1 to about 18 carbon atoms, and hydroxyalkyl esters of acrylic and methacrylic acids, wherein the hydroxyalkyl moiety contains from 2 to about 10 carbon atoms, wherein said polymer has a glass transition temperature above about 25° C. and wherein said solution has a viscosity of less than about 13 seconds (#4 Ford cup) and the ratio of acetone to other organic solvents is at least 3;
   (2) adding to the product of step (1) from about 3 to about 10 percent water, based on the volume of acetone employed; and
   (3) spray-drying the product of step (2).

2. The process of claim 1, wherein the amount of water employed is from about 5 to about 8 percent.

3. The process of claim 1, wherein the amount of water employed is about 7 percent.

4. The process of claim 1, wherein the ratio of acetone to other organic solvents is at least 4.

5. The process of claim 1, wherein acetone is the only organic solvent present.

6. The process of claim 5, wherein the amount of water employed is from amout 5 to about 8 percent.

7. The process of claim 5, wherein the amount of water employed is about 7 percent.

References Cited

UNITED STATES PATENTS

| | | | |
|---|---|---|---|
| 2,517,127 | 8/1950 | Meitzner | 260—89.5 S |
| 3,377,323 | 4/1968 | Ioka et al. | 260—89.5 S |
| 3,505,299 | 4/1970 | Baker et al. | 260—89.5 S |
| 3,591,569 | 7/1971 | Ilavsky | 260—89.5 S |

OTHER REFERENCES

ASTM Standards 21 (ASTM Designation D1200–58), January (1965), pp. 222–224 (TA 401 A5 ST).

HARRY WONG, JR., Primary Examiner

U.S. Cl. X.R.

117—161; 260—29.6 R, 31.2 R, 32.8 R, 33.4 R, 33.6 UA, 73 R, 78.5 R, 80.8, 80.81, 85.5 ES, 86.1 R, 86.1 N, 86.1 E, 86.3, 86.7, 851, 901